United States Patent [19]
Powell

[11] Patent Number: 4,611,575
[45] Date of Patent: Sep. 16, 1986

[54] PARABOLIC TROUGH SOLAR REFLECTOR

[76] Inventor: Roger A. Powell, 1589 Vernon Rd., Norristown, Pa. 19401

[21] Appl. No.: 587,137

[22] Filed: Mar. 7, 1984

[51] Int. Cl.⁴ ................................................. F24J 2/10
[52] U.S. Cl. ..................................... 126/438; 126/417; 126/450; 126/432
[58] Field of Search ............... 126/417, 418, 432, 438, 126/439, 450; 350/282, 293, 310

[56] References Cited

U.S. PATENT DOCUMENTS

| | | | |
|---|---|---|---|
| 4,115,177 | 9/1978 | Nelson | 126/450 |
| 4,127,926 | 12/1978 | White | 350/293 |
| 4,220,136 | 9/1980 | Penney | 126/438 |
| 4,240,406 | 12/1980 | Hutchinson | 126/438 |
| 4,256,091 | 3/1981 | Hallows | 126/450 |
| 4,263,893 | 4/1981 | Powlak et al. | 126/438 |
| 4,268,332 | 5/1981 | Winders | 126/417 |
| 4,281,643 | 8/1981 | Kibblewhite | 126/450 |
| 4,326,773 | 4/1982 | Colas | 126/438 |
| 4,327,707 | 5/1982 | Wilhelm | 126/450 |
| 4,351,319 | 9/1982 | Robbins, Jr. | 126/439 |
| 4,372,027 | 2/1983 | Hutchinson | 126/438 |
| 4,416,263 | 11/1983 | Niedermeyer | 126/438 |
| 4,423,719 | 1/1984 | Hutchinson | 126/438 |
| 4,432,343 | 2/1984 | Riise et al. | 126/438 |
| 4,515,148 | 5/1985 | Boy-Marcotte et al. | 126/438 |

Primary Examiner—Samuel Scott
Assistant Examiner—Helen A. Odar

[57] ABSTRACT

A solar trough reflector structure using a single stressed reflector skin, parabolic shaped ribs, and members to structurally close the aperture develops high strength and stiffness from a minimum of material.

8 Claims, 5 Drawing Figures

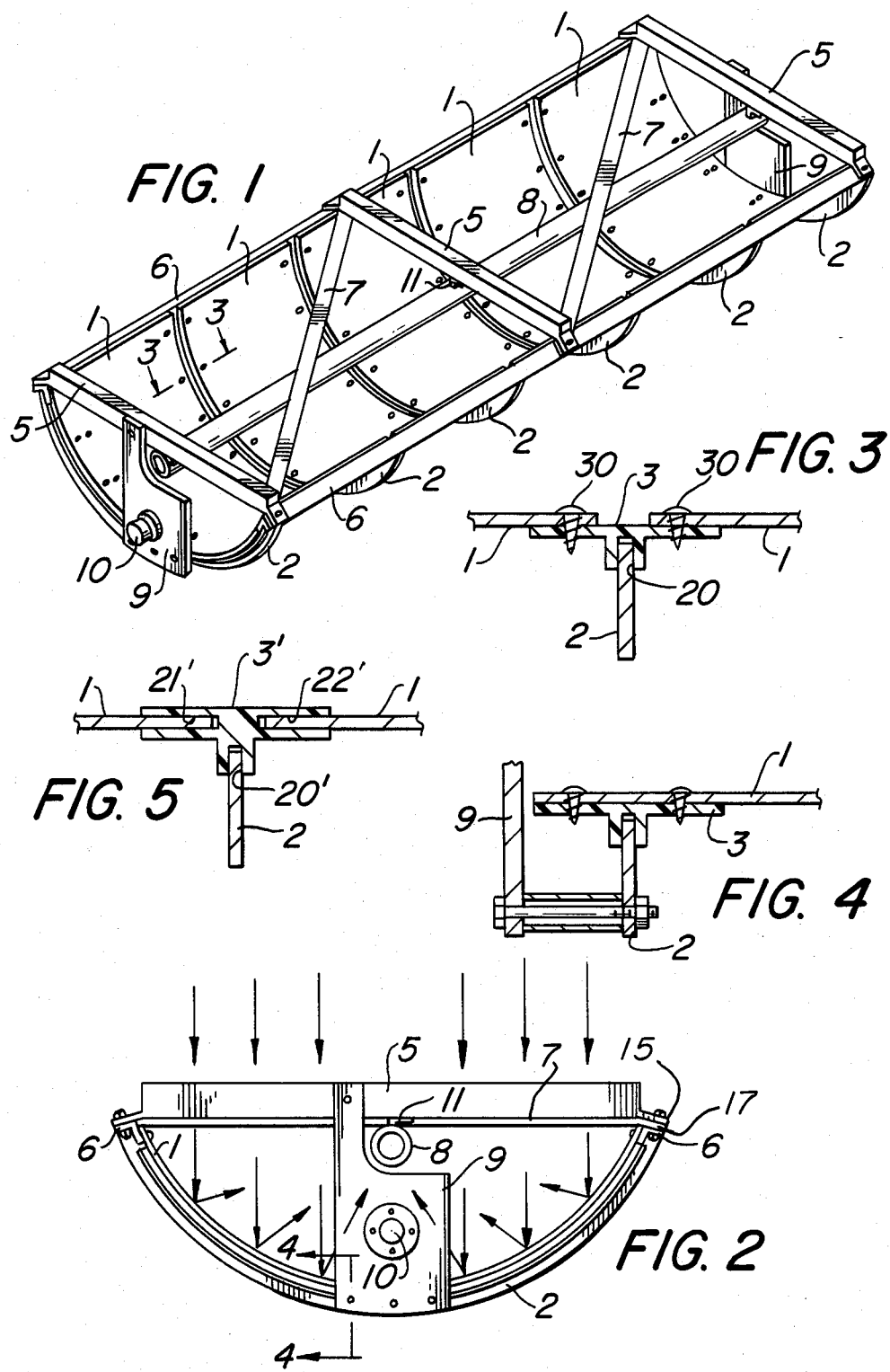

PARABOLIC TROUGH SOLAR REFLECTOR

BACKGROUND OF THE INVENTION

The present invention relates to solar energy conversion apparatus and, more particularly, to improvements in solar energy collectors of the trough reflector type and to methods of manufacturing same.

Considerable time and effort is presently being expended in determining the feasibility of utilizing the sun's energy as a means for providing the heating and power needs of home and industry. While know-how exists for converting solar energy into vast quantities of heat and electrical energy, the principal stumbling block confronting widespread commercial use of the sun's rays for such purposes is one of economics.

A major factor contributing to the relatively high cost of solar energy converters is the cost associated with the manufacture of the collector component; i.e., the reflector or lens which acts to collect and focus solar rays to form a region of intense heat. To produce significant quantities of heat or electrical energy economically from solar energy, collectors of substantial size are required. To satisfy this requirement, large trough-shaped reflectors have been proposed and, in some instances, are being utilized as the collector element. While such reflectors are substantially less expensive than refractive elements of comparable light-gathering power, their manufacturing costs are, for the size required, still at a level which renders large-scale energy production economically marginal. To date, trough reflectors have been conceived and/or made of glass, space-frame structures and segmented sheets, or molded composite plastic materials. Such conventional reflectors are not only difficult to fabricate, but also they require the use of relatively expensive materials.

The trough collector must possess a high-accuracy reflector surface and maintain the surface profile and its structural integrity throughout environmental extremes. The most strenuous structural test is from wind-induced loads. The bending load is proportional to the collector width, and the torsional load is proportional to the square of the collector width.

To date, the most cost-effective trough collectors have been of two types. First, there is the torque-tube design that incorporates a tube or pipe that forms a backbone for the trough collector and absorbs the wind-induced bending and torsional loads. An example of this design is disclosed in U.S. Pat. No. 4,135,493. This design uses a number of thin transverse ribs attached to a pipe backbone. The reflector sheet is loaded by end pressure against the parabolic shape cut into the transverse ribs to generate the parabolic trough shape. A second sheet of material is required on the back surface of the ribs for strength and to keep wind pressure from lifting the reflector sheet off the front surface of the ribs. The bending and torsional strength are a simple strength of materials function of the properties of the torque tube. The widest collector built to date by this method is seven feet and this appears to be the design limit when balanced against the cost of stronger materials.

Second, there is the monocoque design that uses a stressed reflector skin and a stressed rear skin that are separated and supported by ribs. An example of this design is disclosed in U.S. Pat. No. 4,240,406. In this design the structure gets its strength from the attachment of the front reflector sheet and a rear sheet to fairly thick transverse ribs, similar to the design of modern airplane wings. This design requires a fairly thick transverse rib so that the reflector sheet and the rear sheet may be fastened to it with screws. The widest collector built to date is eight feet which appears to be the design limit.

Both of the above-described designs are conceived with the initial constraint that no structure may obscure the entrance aperture since this will lower performance. Typically, this initial constraint has been widespread in the solar concentrator field and may explain, at least in part, why the present invention has not been previously conceived.

Some collectors such as that disclosed in U.S. Pat. No. 4,205,659 have used a clear protective covering of plastic film which may make a small contribution to the torsional stiffness but this is severely limited by: (1) the small effective cross-sectional stress area since the recommended material is only 0.004 inch thick; (2) the requirement for a long-life rigid edge fastening; and (3) the requirement of permanent pre-stressing of the material since it is non-rigid. Further, the recommended material transmits 90% of the incident solar energy, which means the entire collection system pays a 10% efficiency loss penalty which cannot be justified by this method of structural stiffness contribution.

SUMMARY OF THE INVENTION

An object of the present invention is to provide a solar collector that lends itself to low cost manufacture, based on eliminating the rear sheet, pipe backbone, and thick transverse ribs. Also, the solar collector of the present invention does not require expensive tooling for its manufacture.

Another object of the present invention is to provide an improved method of making trough-shaped reflectors which are of a size and quality suitable for large scale solar energy conversion work. Typically, the available collectors have an aperture width limit of eight feet. The aperture is limited in the present designs by the torsional stiffness and strength of the design, since the torsional load due to wind increases by the square of the aperture width. The present invention has an inherent torsional stiffness and strength advantage of present designs thus allowing twelve foot and larger width collectors to be built. Larger width aperture collectors have economic advantages in initial production costs and in field erection costs.

Another object of the present invention is to provide an inexpensive method for attaching the reflector sheet material to the concave parabolic surface of transverse ribs.

According to this invention, trough reflectors with a width of twelve feet and greater and quality suitable for energy conversion work can be inexpensively fabricated by attaching large sheets of plastic, sheet-metal, or glass/metal laminates by novel means to thin transverse ribs of parabolic shape to thereby produce a trough-shaped segment of a large tube. The open side of the tube (i.e., the aperture) is structurally closed with thin transverse and diagonal members to yield a tube of "D" shaped cross-section. This design eliminates the rear sheet, the pipe backbone, and thick transverse ribs. Further, this design allows a minimum of material to produce the maximum structural stiffness and strength in order to withstand wind loads. The structural closing of the open side of the trough-shaped tube segment is accomplished by the use of thin structural members to minimize the obstruction of the incoming solar energy. The loss of performance due to this obstruction is less than 5% and is offset several times over by the reduction in unit cost and the ability to increase the aperture width.

Other objects and various advantages of the invention will become apparent to those skilled in the art from the ensuing description of preferred embodiments, reference being made to the accompanying drawings in which like reference characters designate like parts.

BRIEF DESCRIPTION OF THE DRAWINGS

FIG. 1 is a perspective view of a trough reflector structured in accordance with a preferred embodiment of the invention.

FIG. 2 is an end view of the trough reflector of FIG. 1.

FIG. 3 is a cross-section taken on line 3—3 of FIG. 1 and showing the attachment detail between a rib and the sheet metal reflector panels.

FIG. 4 is a cross-section taken on line 4—4 of FIG. 2.

FIG. 5 is a cross-sectional view of another construction of the attachment between a rib and the sheet metal reflector panels.

DETAILED DESCRIPTION OF THE PREFERRED EMBODIMENTS

Referring to the drawings, in FIGS. 1 and 2 there is shown a solar trough reflector structure incorporating a preferred embodiment of the invention which includes a plurality of a thin sheets 1 of reflecting material formed into a concave trough shape. The concave side of each sheet 1 is provided with reflective material which is either a highly polished base material with a reflective film, a glass mirror, or other means to make it reflective to solar energy. The base material to which the reflective surface is affixed may be sheet metal or plastic but is preferably thin to minimize weight and cost. The thin reflective sheets 1 are mounted in end-to-end relation and are attached to spaced rib members 2, which are mounted to extend in a plane that is perpendicular to the longitudinal axis of the concave reflective sheets 1 as shown in FIG. 1. The rib members 2 are manufactured with a parabolic configuration at their concave interface with the reflective sheets 1 and the attachment to sheets 1 being such that the sheets 1 are caused to assume the parabolic configuration imparted by the rib members 2. The parabolic shape of the rib members 2 may be produced by blanking in a press, milling, or high-speed plasma-arc cutting.

Means are provided at the transverse ends of sheets 1 for attaching the sheets 1 and rib members 2 together. At the joints between adjacent sheets 1, such means comprises a joining member 3 which, in the form of the invention shown in FIG. 3, comprises a T-shaped member having a slot 20 into which a rib member 2 is inserted and adhesively bonded. Slot 20 is perpendicular to the concave portion of joining member 3 to which the transverse ends of adjacent sheets 1 are secured by fastening screws 30 as shown in FIG. 3. Alternatively, sheets 1 can be secured to joining members 3 by adhesive bonding.

Another form of joining member 3' is shown in FIG. 5, and comprises a metal or plastic extrusion having a slot 20' into which a rib member 2 is inserted to be adhesively bonded therein. The extruded joining member 3' also has a pair of aligned, outwardly facing slots 21' and 22' which are perpendicular to slot 20'. Slots 21' and 22' have the transverse adjacent ends of sheets 1 inserted and bonded therein to provide a joint structure as shown in detail in FIG. 5.

In both of the attachment embodiments shown in FIGS. 3 and 5, it is preferred to clamp the inner concave faces of the joining members 3 and 3' in contact with an accurate male mold during the adhesive bonding of the associated rib member 2 to such joining member to thereby ensure a precision interface for the reflective sheet attachment. More specifically, the method for attaching the thin reflective sheet 1 to a curved rib member 2 comprises the steps of (1) contacting a first face of an intermediate joining member 3 to a curved master form, (2) attaching the said curved rib member to a second face of the intermediate joining member 3 by rigid means that do not substantially disturb the contact between said first face and said master form, (3) removing said intermediate joining member and the attached rib member from contact with said curved master form, and (4) attaching said reflective sheet 1 to said first face.

The rib members 2 are attached at their ends to a pair of longitudinal structural angle members 6 by a suitable joining method such as welding. The longitudinal edges of the reflective sheets 1 are also attached to the longitudinal members 6, by fastening screws 30, to provide a resulting structure that is a portion (about ½) of a somewhat flattened tube having a D-shaped cross-section. Since this construction is a structurally "open" cross-section, its bending and torsional rigidity are much less than that of a comparable tube having a structurally "closed" cross-section. Pursuant to the invention, a plurality of cross members 5 are attached to the longitudinal members 6 at corresponding points along their length, the cross members 5 preferably being spaced equally along the length of the members 6, as shown in FIG. 1. In addition, diagonal members 7 are secured to the longitudinal members 6 to extend therebetween on an axis skewed to the longitudinal axis. At each of their ends cross members 5 and diagonal members 7 are provided with end portions 15 and 17, respectively, having aligned bolt holes adapted to receive bolts 18 which co-operate with nuts to secure each of the ends of cross members 5 and diagonal members 7 to an associated longitudinal member 6 as is best shown in FIG. 2.

The diagonal members 7 are required to prevent the planar face composed of longitudinal members 6 and cross members 5 from distorting into a parallelogram shape under load. The resulting structure in accordance with the invention thus behaves as a "closed" tube to thereby provide high torsional and bending stiffness at a minimum of weight, and thus a minimum of material cost. By reason of the construction in accordance with the invention, the maximum amount of material is placed at locations where it can be most effective, namely, at the maximum effective diameter.

At each end of the apparatus an end plate 9 is attached to an endmost rib member 2 and an associated cross member 5 as is best shown in FIG. 2. A stub axle 10 is attached to each of the end plates 9 with axle 10, in turn, being supported by a bearing (not shown) mounted on a support pylon (not shown), as a common practice and is well known in the art.

By this construction the entire structure can pivot about the axis of the axles 10 so that the reflector surface can follow the apparent daily motion of the sun, the sun rays being indicated by the arrows in FIG. 2. The structure is driven in rotation by a motor and gearbox and controlled by a positioning equipment that is well known by those skilled in the art. The solar energy is focused by the reflector surface onto a heat-absorbing pipe assembly 8 that is composed of a steel pipe, electroplated with black chrome which selectively absorbs the spectral wavelengths of the sun efficiently but emits a minimum of energy, and which is surrounded by a glass tube that limits convection losses. The heat absorbing pipe assembly 8 is well known to those skilled in the art and is supported by brackets 11 attached to the cross-members 5.

The cross-members 5, diagonal members 7, end plates 10 and heat absorber pipe assembly 8 are removable for shipment so that the collectors can be stacked within one another or "nested" and, therefore, consume the minimum volume to minimize shipping expense. A specific embodiment of the present design would be 11.5 feet overall width by 20 feet overall length with a 10.5 by 20 foot gross aperture. The width is limited to 11.5 feet due to shipping considerations. The flexible planar sheets 1 would be 4 feet by 12 feet sheets of 0.050 inch thick sheet steel with a reflective film such as FEK-244 manufactured by the 3M Company, adhesively bonded to it. The rib members 2 would be produced from 0.25 inch thick steel plate. The longitudinal members 6, cross-members 5 and diagonal members 7 would be 3"×3"×¼" thick structural angles. The end plates 9 would be 10 inch structural channel. A finite-element computer analysis indicates this reflector would withstand wind loads of 10.8 pounds per square foot (80 mile per hour wind) and deflect less than 0.12 inch. Under a torsional load of 114,000 inch pounds, the structure will deflect less than 4.5 milliradians. These stiffnesses are significantly greater than existing designs with only 8 foot widths.

While the invention has been described with particular reference to certain preferred embodiments, it will be appreciated that various modifications and extension of the invention can be made without departing from its spirit and scope, as set forth in the enumerated claims. For instance, while the trough reflector of the invention has been described with particular reference to solar energy conversion work, it will be appreciated that its use is not in any way limited to such work. It can be utilized for any purpose requiring a cylindrical, or even parabolic, reflector of relatively large size.

What is claimed is:

1. A trough reflector comprising:
   means for providing a sheet of reflective material formed into an open concave trough shape and having a longitudinal axis,
   a plurality of rib members positioned perpendicular to said longitudinal axis and attached to said sheet,
   a pair of elongated longitudinal members whose axes are parallel to said longitudinal axis, said longitudinal members being attached to the ends of said rib members,
   a plurality of cross members extending across the open portion of said sheet with opposite ends thereof attached to each of said longitudinal members, and forming a rectangular frame,
   at least one diagonal member extending on an axis skewed to the axis of said longitudinal members with opposite ends thereof attached to said rectangular frame at opposing corners,
   an elongated receiver, substantially parallel to said longitudinal axis and substantially displaced from said sheet of reflective material, said elongated receiver absorbing concentrated radiant energy reflected from said sheet of reflective material,
   means for rotating said trough reflector about one axis during a day, thereby tracking the apparent motion of the sun.

2. A trough reflector acording to claim 1 wherein said means for providing a sheet of reflective material is comprised of a plurality of individual sheets mounted in end-to-end relationship having a joint at adjacent ends of adjacent sheets, said joint being adjacent to said rib members, and including a joining member mounted at said joint for joining said adjacent sheets together, said joining member having means for attachment with said rib member.

3. A trough reflector according to claim 2 wherein said joining member has a constant cross-section profile along its length, a surface for receiving a rib member, and a pair of surfaces for attaching said adjacent ends of adjacent sheets.

4. A trough reflector according to claim 1 wherein the focus of said reflector is located between said sheet of reflector material and said cross members.

5. A method for making a trough reflector structure comprising the steps of:
   A. forming a sheet of reflective material into a concave trough shape having a longitudinal axis;
   B. attaching said sheet to a plurality of curved rib members positioned perpendicular to said longitudinal axis;
   C. attaching the ends of said rib members to a pair of elongated members whose axes are parallel to the longitudinal axis,
   D. interconnecting points of said elongated members with a plurality of transverse members whose axes are perpendicular to the axis of said elongated member thus forming a rectangular frame;
   E. interconnecting opposing points of said rectangular frame with one or more diagonal members whose axis is skewed to the axis of said elongated member,
   F. providing an elongated receiver, substantially parallel to said longitudinal axis and substantially displaced from said sheet of reflective material, said elongated receiver absorbing concentrated radiant energy reflected from said sheet of reflective material,
   G. providing means for rotating said trough reflector about one axis during the day, thereby tracking the apparent motion of the sun.

6. The method of claim 5 whereby the step of attaching said sheet to a plurality of curved rib members further comprising a plurality of intermediate members, each having attachment surfaces for said sheet and said curved rib member.

7. The method of claim 6 further comprising the step of first attaching each said curved rib member to each said intermediate member while said intermediate member is in contact with means to precisely locate the attachment surface with said sheet.

8. The method of claim 7 whereby the step of precisely locating the attachment surface with said sheet includes clamping the intermediate member to a curved master form.

* * * * *